United States Patent [19]

Derbyshire

[11] 4,073,498
[45] Feb. 14, 1978

[54] DRILL CHUCKS

[75] Inventor: George Cecil Derbyshire, Sheffield, England

[73] Assignee: The Jacobs Manufacturing Company, Limited, Sheffield, England

[21] Appl. No.: 664,489

[22] Filed: Mar. 8, 1976

[30] Foreign Application Priority Data

Apr. 1, 1975 United Kingdom ............... 13271/75

[51] Int. Cl.² .......................................... B23B 31/04
[52] U.S. Cl. ...................................... 279/62; 279/1 K
[58] Field of Search ..................... 279/64, 62, 61, 60, 279/1 K, 116

[56] References Cited

U.S. PATENT DOCUMENTS

| 833,351 | 10/1906 | Towsend | 279/1 K |
|---|---|---|---|
| 872,841 | 12/1907 | North | 279/62 |
| 3,737,170 | 6/1973 | Wanner et al. | 279/60 |
| 3,810,642 | 5/1974 | Derbyshire | 279/62 |
| 3,949,998 | 4/1976 | Dietzen et al. | 279/62 |

Primary Examiner—Z. R. Bilinsky
Attorney, Agent, or Firm—Stephen J. Rudy

[57] ABSTRACT

A drill chuck of the angularly sliding jaw type having an integral nut and bevel gear element formed as an unbroken ring and then split in halves, the halves being held together by a chuck sleeve; and the teeth of the bevel gear being "blind", that is, to say the teeth are connected at their radially inner ends by an integral strengthening collar. The collar forms one of two bearing faces to maintain axial alignment of the integral nut and bevel gear element in the chuck body element.

3 Claims, 7 Drawing Figures

DRILL CHUCKS

BACKGROUND OF THE INVENTION

The invention relates to drill chucks and has for its object to provide an improvement therein. In particular, the invention is concerned with the kind of drill chuck which is provided with a body part in which jaws are slidably mounted for converging movement in respective bores and in which a nut member is rotatably mounted in a circumferential groove encircling the body part and which breaks into said bores, said nut having screwthreaded engagement with thread elements formed on the jaws for advancing or retracting the jaws. The construction of this kind of chuck is such that the nut member must be formed in halves so that it can be located in the circumferential groove in the body part, the halves of the nut then being held tightly together by another element of the chuck. A bevel gear element, with which the teeth of an extraneous chuck key can be engaged for slackening or tightening the jaws, is either connected to the nut member or formed integrally with it. If not formed integrally with the nut member, the bevel gear element may be formed as an unbroken ring and in this case can be the element which holds the halves of the nut member tightly together.

According to the invention, there is provided a drill chuck of the kind referred to in which the teeth of the bevel gear element connected to or formed integrally with the nut member are "blind", that is to say they are connected at their radially inner ends to a part of the bevel gear element which forms a strenthening collar and one of two bearing faces. Preferably, the part of the bevel gear element whch forms a strengthening collar is accommodated in a reduced diameter portion of the body part which runs into the circumferential groove in which the nut member is mounted, and in this case a flat annular surface formed by the strengthening collar bears against an annular wall of said reduced diameter portion. The bevel gear element will preferably be formed integrally with the nut member and provide parallel bearing surfaces which will bear against the annular walls of said circumferential groove to maintain the integral bevel gear and nut element square with the axis of the drill chuck body.

BRIEF DESCRIPTION OF THE DRAWING

In order that the invention may be fully understood and readily carried into effect, the same will now be described, by way of example only, with reference to the accompanying drawings, of which:

FIGS. 5 to 7 are views similar to FIG. 1 which illustrate possible modifications which will presently be referred to.

DETAILED DESCRIPTION OF THE INVENTION

Figure 1:
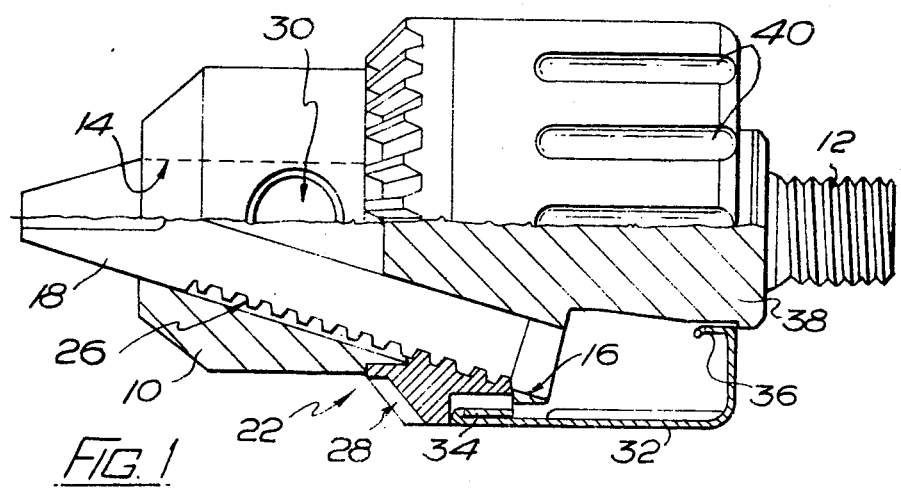
FIG. 1 is a side view, partly in longitudinal section, of a drill chuck embodying the invention.

Referring now to FIGS. 1 to 4 of the drawings, the drill chuck there illustrated includes a body part 10 having at one end a screwthreaded spigot portion 12 for connection to a power tool driving spindle (not shown) and at its other end an axially extending bore 14 for the reception of a drill shank (not shown). Three equally spaced bores 16, only one of which is shown in the drawing, diverge from the axially extending bore for the reception of respective jaws 18, the jaws being slidably mounted in the bores 16 so that as they are advanced they converge to grip a drill shank between parallel end portions and when they are retracted into the body part they release the shank.

A circumferential groove 20 extends around the body part intermediate the ends of the latter and breaks into the bores 16. An integral nut and bevel gear element generally indicated 22, formed in halves, engages the groove so that the nut portion 24 thereof, which is formed with a tapering internal screwthread, has threaded engagement with thread elements 26 of jaws 18. The bevel gear element 28 of the element 22 lies adjacent a cylindrical portion of the body part in which three equally spaced radial blind bores 30 are formed, said blind bores being provided for the reception of a pilot end of an extraneous chuck key (not shown) having a bevel pinion capable of engaging the teeth of the bevel gear element 28. In this way, the chuck jaw can be simultaneously advanced or retracted, as required, in known manner.

The integral nut and bevel gear element 22, which as previously stated is in halves, is axially located by its engagement in the groove 20 and is held together by a cylindrical sleeve 32 made as a pressing from a relatively light gauge metal plate, substantial strength having been imparted thereto at an end which encircles the element 22 by forming the sleeve with a completely inturned edge 34. The integral nut and bevel gear element is stepped for the reception of the strengthened end of the sleeve, as shown, and the outside diameter of that end of the sleeve is the same as that of the outside diameter of the bevel gear portion of the element 22. The end of the sleeve remote from the integral nut and bevel gear element is completely inturned to form a flange 36 which extends concentrically within the generally cylindrical shape of the sleeve, said flange forming a bearing surface and engaging a cylindrical portion 38 of the body part adjacent the screwthreaded spigot portion 12. In addition, the metal sleeve has been formed with a series of flutes 40 which further strengthen the light gauge wall of said sleeve and also provide a convenient gripping surface for the user's hand when he requires to make manual adjustments.

Figure 2:
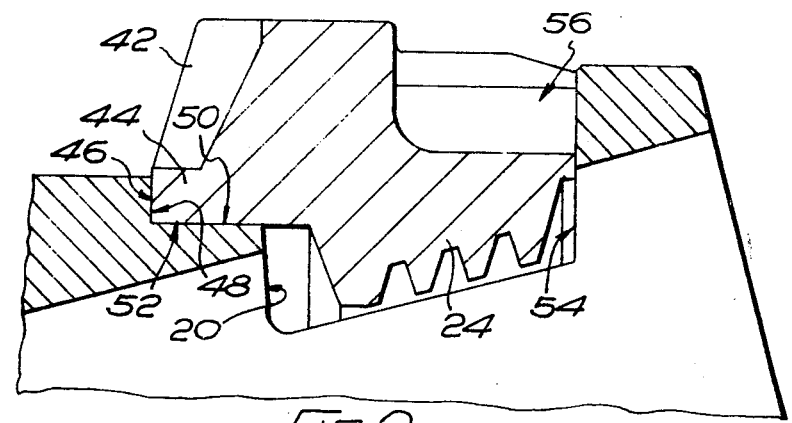
FIG. 2 is a scrap view drawn to a somewhat enlarged scale.
Figure 3:
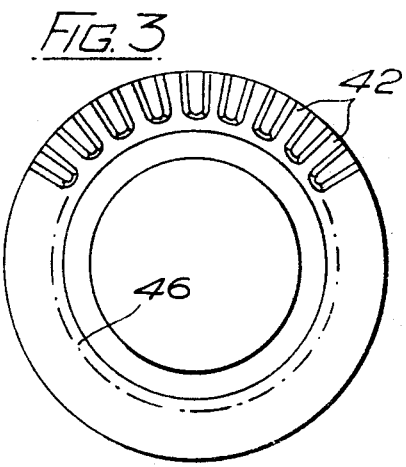
FIGS. 3 and 4 are views on opposite ends of a component part of the chuck.

Referring now in particular to FIGS. 2 and 3, it will be seen that since the integral nut and bevel gear element 22 has been made of sintered metal (that is to say under pressure in a mould) the teeth 42 of the bevel gear element 28 have been able to be made "blind", that is to say they are connected at their radially inner ends to a part 44 which forms a strengthening collar. The bevel gear teeth are consequently much stronger than those of a "non-blind" bevel gear of a conventional form and similarly constructed. In addition, as shown in FIG. 3, the part 44 which forms a strengthening collar provides a flat annular surface 46 which is unbroken by the spaces between adjacent gear teeth and this can abut against an annular end wall 48 of a reduced diameter portion 50 of the body part which runs into the groove 20. The integral nut and bevel gear element is accurately located axially of the chuck by virtue of the abutment of the surface 46 against the end wall 48 and the abutment of the opposite end of the nut and bevel gear element with the side wall 54 of the groove 20.

Figure 4:
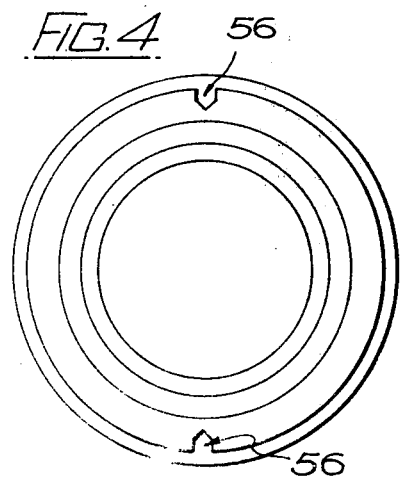

As previously mentioned, the integral nut and bevel gear element 22 has been made of sintered metal and it has in fact been made by a method which has included the initial step of making the complete nut and bevel gear element as an unbroken ring, as shown in FIGS. 3 and 4, and the subsequent step of splitting the unbroken ring on a line of weakness created by a pair of diametrically disposed notches 56. There is thus produced a pair of perfectly matching halves.

It will be understood that not only the teeth of the bevel gear element, but also the tapering internal bore of the nut portion and the notches 56, will be formed during the sintering operation. The notches 56, which are visible in FIGS. 2 and 4, are of course hidden from view when the cylindrical sleeve is pressed onto the stepped portion of the integral nut and bevel gear element.

The chuck which has been described above by way of example has been found to be somewhat cheaper to produce than similar chucks of conventional construction by virtue of the forming of the integral nut and bevel gear element by powered metal technology and also by virtue of the fact that the sleeve 32 has been formed as a pressing from relatively light gauge metal plate. The production of the integral nut and bevel gear element in the manner described (either by sintered metal techniques or by forging) has made possible the other improvements pointed out, that is to say the strengthening of the bevel gear teeth by the provision of the collar part 44, and also the provision of the bearing surface 46 against the end wall 48 and the opposite end with the side wall 54 of the groove 20.

Figure 5:
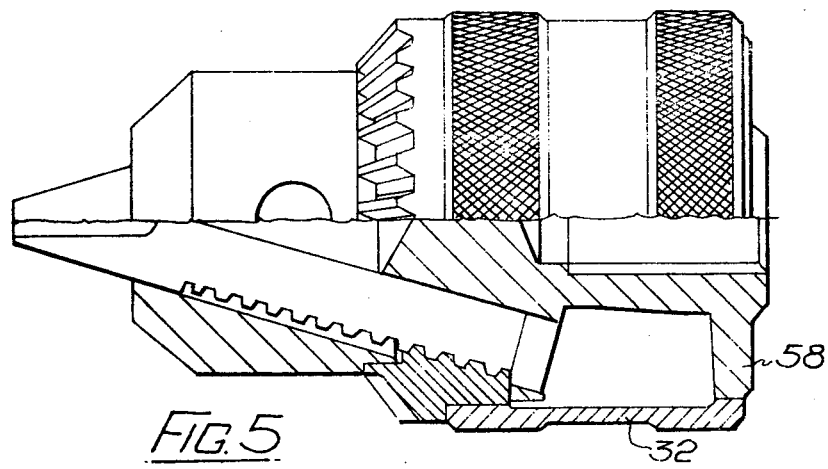

Referring now to FIG. 5, this illustrates a construction of drill chuck very similar to that described with reference to FIGS. 1 to 4, the main difference being that the cylindrical sleeve 32 has been machined from solid instead of being made as a pressing from relatively light gauge metal plate (one end of said sleeve being made a tight press fit on the assembled halves of the integral nut and bevel gear element of course and the other end of said sleeve being rotatable on a flange portion 58 of the body part). A minor modification resides in the fact that the body part is provided with an internally screwthreaded recess instead of with a screwthreaded spigot portion.

Figure 6:
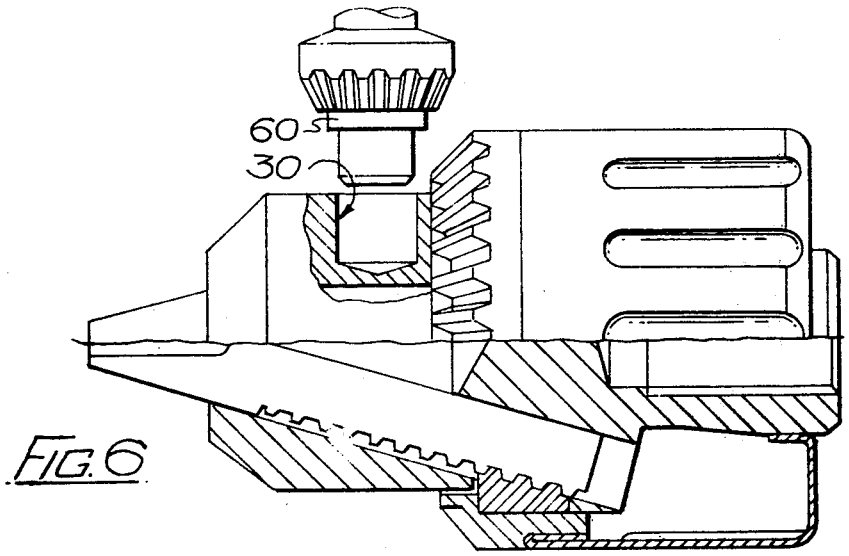

In FIG. 6, the construction illustrated is similar to that of FIGS. 1 to 4 in the sense that the sleeve is made as a pressing but the nut and bevel gear elements have been made separately. The nut has of course been made in halves so that it has been able to be assembled together in its groove but the bevel gear element has been formed as an unbroken ring which has been press fitted on the assembled halves of the nut. The sleeve has then been press fitted on the bevel gear element.

It will be seen that the teeth of the bevel gear element have been made "blind" as in the case of the construction in which the nut and bevel gear element are formed integrally together. However, in this case the part of the bevel gear which forms a strengthening collar encircles the cylindrical portion of the body part in which the radial blind bores 30 are formed. Consequently, the extraneous chuck key required for opening and closing the jaws of this particular chuck has been specially formed with a spacer collar 60 adjoining its pilot end to ensure correct engagement of its teeth with the teeth of the bevel gear element.

Figure 7:
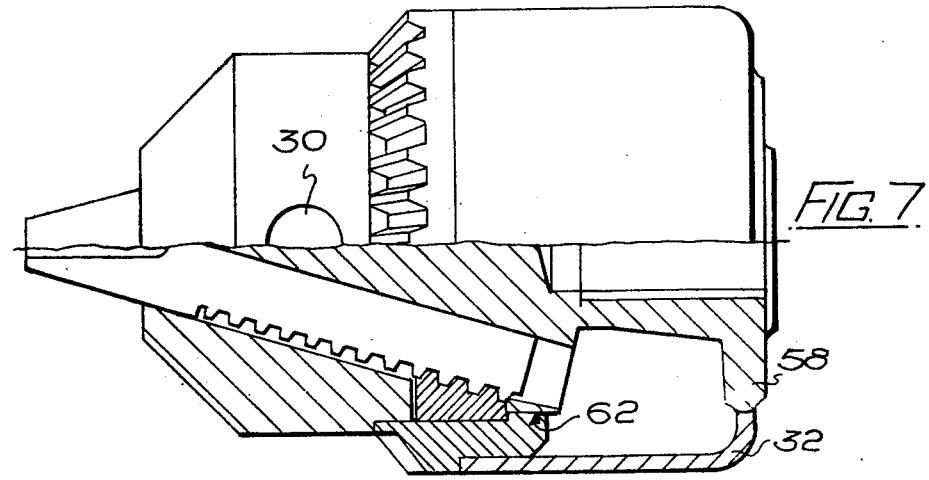

Referring finally to FIG. 7, in a further modified form of chuck embodying the invention the nut and bevel gear elements are again formed separately but the bevel gear element formed as an unbroken ring has been press fitted on the assembled halves of the nut by being passed over a reduced diameter portion 62 of the body part. Consequently, the part of the bevel gear which forms a strengthening collar for its teeth is accommodated within the diameter of the cylindrical portion in which the radial blind bores 30 are formed. A rearward portion of the bevel gear forms a shoulder 62 which is pressed, during assembly, against one face of the nut element.

A further modification which is illustrated in FIG. 7 is that the cylindrical sleeve 32 is in this case made of a synthetic plastics material press fitted at one end on the bevel gear element. At its other end said sleeve rotatably engages the periphery of the flange portion 58 which has been formed on the body part as in the construction of FIG. 5.

As previously indicated, the invention is not limited to a chuck in which the nut and bevel gear element has been made of sintered metal. For example, the form of bevel gear described in each of the chuck constructions described above could be produced by forging, but of course in this case a subsequent machining operation would almost certainly be required to produce a satisfactory surface finish on the bearing surfaces and the integral nut and bevel gear element, or the separately formed nut as the case may be, would need to be hardened before it could be divided into halves by a splitting technique.

Various other modifications may be made to the chuck just described. For example, the body part of a chuck embodying the invention may be adapted for connection to any kind of power tool driving spindle, that is to say, for example, it may be provided with an internally screwthreaded recess or screwthreaded spigot portion or a Morse taper shank portion.

I claim:

1. A drill chuck comprising a body part formed to provide spaced converging bores for the reception of jaws which are movable relative to an axially extending bore formed in the body part, and being further formed to provide a circumferential groove extending about the periphery of the body part and intersecting the spaced bores, a jaw located in each said bore, each said jaw having a gripping portion and a threaded portion on part of its surface, a ring shaped rotatable means defining an integral bevel gear portion located at an end of said ring and a threaded nut portion located on the internal wall of said ring, said ring being positioned in the circumferential groove with the nut member portion being threadably engaged with said jaws to provide movement of said jaws when the bevel gear element is rotated with respect to said body, a circumferential collar formed on the rotatable means, said bevel gear element portion having a plurality of gear teeth with inner ends formed integrally with and being bounded by the circumferential collar, an end surface of said collar being in abutment with a radial surface of the circumferential groove, and a cylindrical sleeve at one end of which engages a portion of the rotatable means, the other end of which engages the body part.

2. A drill chuck according to claim 1, in which the body part is formed to provide a reduced diameter portion which is contiguous with the circumferential groove, and receives the circumferential collar of the rotatable means.

3. A drill chuck according to claim 2, in which the rotatable ring means is split into two symmetrical parts.

* * * * *